(12) United States Patent
Qiu et al.

(10) Patent No.: US 12,197,424 B2
(45) Date of Patent: Jan. 14, 2025

(54) BLOCKCHAIN DATA INDEX METHOD, BLOCKCHAIN DATA STORAGE METHOD AND DEVICE

(71) Applicant: HANGZHOU QULIAN TECHNOLOGY CO., LTD., Zhejiang (CN)

(72) Inventors: Weiwei Qiu, Zhejiang (CN); Wei Li, Zhejiang (CN); Liang Cai, Zhejiang (CN); Fanglei Huang, Zhejiang (CN); Xiaomin Ma, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 14 days.

(21) Appl. No.: 17/897,735

(22) Filed: Aug. 29, 2022

(65) Prior Publication Data

US 2022/0414090 A1 Dec. 29, 2022

Related U.S. Application Data

(63) Continuation-in-part of application No. PCT/CN2020/140251, filed on Dec. 28, 2020.

(30) Foreign Application Priority Data

May 18, 2020 (CN) .......................... 202010419364.9

(51) Int. Cl.
*G06F 16/23* (2019.01)
*G06F 16/22* (2019.01)
*G06F 16/245* (2019.01)

(52) U.S. Cl.
CPC .......... *G06F 16/2379* (2019.01); *G06F 16/22* (2019.01); *G06F 16/2365* (2019.01); *G06F 16/245* (2019.01)

(58) Field of Classification Search
CPC .. G06F 16/2379; G06F 16/22; G06F 16/2365; G06F 16/245; G06F 16/2272; G06F 16/27; G06Q 20/389
See application file for complete search history.

(56) References Cited

U.S. PATENT DOCUMENTS 10,417,219 B1 9/2019 Yang et al.
2015/0347481 A1* 12/2015 Chen ..................... G06F 16/51
707/743

(Continued)

FOREIGN PATENT DOCUMENTS

CN 107239954 A 10/2017
CN 108170857 A 6/2018

(Continued)

OTHER PUBLICATIONS

W3schools.com, w3schools.com/sql/sql_and_or.asp w3schools.com/nodejs/nodejs_mongodb.asp (Year: 2019).*

(Continued)

*Primary Examiner* — Hosain T Alam
*Assistant Examiner* — Chongsuh Park
(74) *Attorney, Agent, or Firm* — Westman, Champlin & Koehler, P.A.

(57) ABSTRACT

A blockchain data index method, a blockchain data storage method and a device are provided. This method first persists a block into a block file, persists an index data layer into an index database, then obtains a matching transaction location according to a query condition, and finally obtains a complete transaction from the block file. In the present application, through expanding the process of the blockchain data storage processing, the blockchain index data is stored in an independent index database and transaction atomicity of multi-database is guaranteed, and a data index mechanism, in which business information is customized in a transaction note field, and then a transaction is associated with the (Continued)

business information through the customized transaction note index field and finally the complete transaction is acquired based on key transaction information, is established.

20 Claims, 3 Drawing Sheets

(56) References Cited

U.S. PATENT DOCUMENTS

| | | |
|---|---|---|
| 2018/0240114 A1 | 8/2018 | Li |
| 2018/0268504 A1 | 9/2018 | Paolini-Subramanya et al. |
| 2019/0034465 A1 | 1/2019 | Shimamura |
| 2019/0095585 A1 | 3/2019 | Jawaharlal et al. |
| 2020/0050595 A1 | 2/2020 | Sun et al. |
| 2021/0266167 A1* | 8/2021 | Lohe .................. G06Q 20/10 |

FOREIGN PATENT DOCUMENTS

| | | |
|---|---|---|
| CN | 108897758 A | 11/2018 |
| CN | 110022298 A | 7/2019 |
| CN | 110750541 A | 2/2020 |
| CN | 110874365 A | 3/2020 |
| CN | 111104386 A | 5/2020 |
| CN | 111339106 A | 6/2020 |
| JP | 2001236358 A | 8/2001 |
| JP | 2013077205 A | 4/2013 |
| JP | 2018132931 A | 8/2018 |
| JP | 2019176458 A | 10/2019 |
| JP | 2020509690 A | 3/2020 |
| JP | 2020057221 A | 4/2020 |

OTHER PUBLICATIONS

"Research on Blockchain Consensus Mechanism Performance Based on Master and Slave Multi-Chain Model", Shandong University, Thesis for Master Degree, Apr. 20, 2018 (English Abstract).
First Office Action dated Jul. 1, 2020; Chinese Application No. 202010419364.9; 3 pages (non-English).
First Office Action dated Jul. 1, 2020; Chinese Application No. 202010419364.9; 5 pages (English).
He, M. et al. "Gossip-based Appropriate Degree Search Strategy by Two-hop Index Replication for Rare Resources", The Mobile Communication Group of the Fourth Laboratory Institute of Information Engineering, Chinese Academy of Sciences Beijing, China.
Notice of Reasons for Refusal dated Jun. 5, 2023; Japanese Application No. 2022-515743; 5 pages (English).
Notice of Reasons for Refusal dated Jun. 5, 2023; Japanese Application No. 2022-515743; 6 pages (non -English).
Search dated Apr. 21, 2023; Japanese Application No. 2022-515743; 30 pages (non-English).
Search dated Apr. 21, 2023; Japanese Application No. 2022-515743; 37 pages (English).
Search dated Jun. 28, 2020; Chinese Application No. 202010419364.9; 1 page.
International Search Report for International Application No. PCT/CN2020/140251; Date of Completion: Mar. 15, 2021; Mar. 25, 2021; 4 Pages.
Translation of International Search Report for International Application No. PCT/CN2020/140251; Date of Completion: Mar. 15, 2021; Mar. 25, 2021; 3 Pages.
Written Opinion for International Application No. PCT/CN2020/140251; Date of Completion: Mar. 22, 2021; Mar. 25. 2021; 4 Pages.

* cited by examiner

BLOCKCHAIN DATA INDEX METHOD, BLOCKCHAIN DATA STORAGE METHOD AND DEVICE

CROSS-REFERENCE TO RELATED APPLICATIONS

The present application is a Continuation-in-part of International Application No. PCT/CN2020/140251 filed on Dec. 28, 2020, which claims priority of Chinese Patent Application No. 202010419364.9, filed on May 18, 2020, entitled "BLOCKCHAIN DATA INDEX METHOD", the contents each of which are incorporated herein by reference thereto in their entity.

TECHNICAL FIELD

The present application relates to the field of blockchain technologies, and particularly to a blockchain data index method, a blockchain data storage method and a device.

BACKGROUND

With rapid development and popularization of blockchain technologies, technical research about blockchain and derivative applications thereof have correspondingly shown explosive increase. Blockchain data has characteristics of tamper roof, verifiable data and traceable data, making the blockchain a core frontier technology for smart government affairs, smart medical care, charity tracking and evidence traceability. Existing blockchain systems generally use a hybrid storage architecture of a Key-Value database storage engine and a file storage. Continuous data such as a block and a transaction is stored in a file, and other data is stored in a Key-Value NoSQL database. Therefore, for data retrieval, only a coarse-grained query can be performed based on the Key value, and the retrieval cannot be performed in term of structuralized data of the Value. For example, if all transactions under an account are required to be queried, then the entire blockchain are traversed, a block number is used as a Key to get a corresponding Value and deserialize content of the block, and next a transaction, in which a transaction sender and a transaction receiver are designated accounts, is screened out. This kind of query method is extremely inefficient and not usable. For another example, if a user wants to screen out a transaction related to a certain business application, filtering can only be performed based on the transaction receiver (that is, a contract address), and cannot be performed based on business data, which is not intuitive enough for the user.

In order to solve this problem, some of existing solutions are divided into two kinds of solutions: 1. a relational database is deployed outside the chain to synchronize data on the blockchain in real time, and the data synchronized from the blockchain is structuralized and stored; 2. the relational database is used as a storage architecture of an underlying blockchain system. The former has low data synchronization efficiency, low real-time performance and increased additional redundant storage overhead, and the query is performed in the off-chain database, which has already broken away from the blockchain, and thus the data is not reliable. The latter structuralizes block data and transaction data of the blockchain and stores them in the relational database, which has higher transformation cost compared with the existing Key-Value based storage architecture, and has worse performance than NoSQL.

SUMMARY

Technical Problems

How to expand the existing storage architecture and how to make the existing blockchain systems support Value-based queries and even support fast retrieval of a transaction related to a certain business on the basis of trying best to reduce additional redundant storage overhead and reduce impact on system throughput are key issues that need to be paid attention to when the blockchain is widely used in traceability scenarios. The present application is aimed to provide a blockchain data index method and a blockchain data storage method in view of the deficiencies in the prior art.

Technical Solutions

A purpose of the present application is achieved through following technical solutions: a blockchain data index method, which includes following steps of:

(1) generating a blockchain transaction and sending the blockchain transaction to a verification node by a blockchain client terminal; here the blockchain transaction includes a transaction sender, a transaction receiver, transaction generation time, a transaction note and a transaction note index; here a data type of the transaction note index is a number, a string, or an array; here the array includes at least one of a number and a string, and elements in the array are well-organized;

(2) receiving the blockchain transaction sent at the step (1) by the verification node, and generating a block and executing the block by a consensus generation block, and then extracting key transaction information of each blockchain transaction in the block to form a key transaction information list and constructing a first index data layer; here the first index data layer includes a block number and the key transaction information list; here the key transaction information includes the transaction sender, the transaction receiver, the transaction generation time, the transaction note index, and a location of the blockchain transaction in the block;

(3) persisting the block generated at the step (2) to a block file and persisting the first index data layer constructed at the step (2) to an index database by the verification node;

(4) sending a query request comprising a query condition and a retrieval mode to the verification node by a client terminal; here the query condition includes one or more of a specified transaction sender, a specified transaction receiver, specified transaction generation time and a specified transaction note index; here the retrieval mode includes a multi-condition AND query, a multi-condition OR query, a sequential precise query based on the specified transaction note index, a non-sequential precise query based on the specified transaction note index and a non-sequential matching query based on the specified transaction note index;

(5) acquiring a block number corresponding to key transaction information of a transaction meeting the query condition and a location of this transaction in the block from the index database acquired at the step (3) by the verification node according to the retrieval mode in the query request sent by the client terminal at the step (4), and querying the block file acquired at the step (3) to acquire a complete transaction and returning the complete transaction to the client terminal by the verification node.

In an embodiment, when the query condition only includes the specified transaction note index and is a specified array, the retrieval mode is selected from the sequential precise query based on the specified transaction note index, the non-sequential precise query based on the specified transaction note index or the non-sequential matching query based on the specified transaction note index; when the query condition is another case, the retrieval mode is selected from the multi-condition AND query or the multi-condition OR query.

In an embodiment, the multi-condition AND query refers to that key transaction information of a certain transaction acquired through retrieving by the verification node from the index database meets all items of the query condition; the multi-condition OR query refers to that key transaction information of a certain transaction acquired through retrieving by the verification node from the index database meets at least one item of the query condition; here: when the transaction sender, the transaction receiver or the transaction generation time in the key transaction information of this certain transaction are the same with the specified transaction sender, the specified transaction receiver or the specified transaction generation time in the query condition, the key transaction information of this certain transaction meets corresponding one item in the query condition; when the specified transaction note index in the query condition is an array, and when the transaction note index in the key transaction information of this certain transaction is the same as elements and sequence of the elements of the specified transaction note index in the query condition, the key transaction information of this certain transaction meets this item in the query condition; when the specified transaction note index in the query condition is not an array, and when the transaction note index in the key transaction information of this certain transaction is the same as the number or string of the specified transaction note index in the query condition, the key transaction information of this certain transaction meets this item in the query condition.

In an embodiment, the sequential precise query based on the specified transaction note index refers to that a transaction note index in key transaction information of a certain transaction acquired through retrieving by the verification node from the index database is the same as elements and sequence of the elements of the specified transaction note index in the query condition; the non-sequential precise query based on the specified transaction note index refers to that a transaction note index in key transaction information of a certain transaction acquired through retrieving by the verification node from the index database is the same as elements of the specified transaction note index in the query condition; the non-sequential matching query based on the specified transaction note index refers to that a transaction note index in key transaction information of a certain transaction acquired through retrieving by the verification node from the index database includes at least one of elements of the specified transaction note index in the query condition.

In an embodiment, further comprising: creating a native database index as a second index layer for a certain field in the first index data layer in the index database acquired at the step (3), and updating the second index layer automatically when the verification node persists the first index data layer constructed by a new transaction into the index database.

In an embodiment, the second index layer is a full index or a partial index; the full index refers to that a native database index is created for a certain field of each of the first index data layer in the index database; the partial index refers to that, regarding a certain field of the first index data layer, a part of the first index data layer in the index database is selected and a native database index is created for this certain field of the part of the first index data layer, that is, when the partial index is created, creation of the second index layer for which part of the first index data layer as well as no creation of the second index layer for which part of the first index data layer are specified through addition of a filter expression.

In an embodiment, the transaction note is any transaction-related data customized by the blockchain client terminal; and the transaction note index is any transaction-related index customized by the blockchain client terminal.

In an embodiment, the number of the elements in the array is no more than 30.

In an embodiment, the string does not exceed 1024 bits.

In an embodiment, the block file supports a Key-Value query; and the index database adopts a non-relational database that supports SQL-like queries.

A blockchain data storage method is further provided, and the blockchain data storage method is applied to a verification node and includes:
  acquiring a blockchain transaction, here the blockchain transaction includes a transaction sender, a transaction receiver, transaction generation time, a transaction note and a transaction note index;
  generating a block and executing the block by a consensus generation block according to the blockchain transaction;
  acquiring a block number of the block, and extracting key transaction information of each blockchain transaction in the block, here the key transaction information includes the transaction sender, the transaction receiver, the transaction generation time, the transaction note index, and a location of the blockchain transaction in the block;
  constructing a first index data layer according to the key transaction information and the block number;
  persisting the first index data layer into the index database;
  persisting the block into a block file.

A device is further provided, which includes one or more processors and a memory configured to store one or more programs, where when executed by the one or more processors, the one or more programs cause the one or more processors to implement any of the above methods.

In the present application, through expanding the process of the blockchain data storage processing, the blockchain index data is stored in an independent index database and the transaction atomicity of multi-database is guaranteed, and a data index mechanism, in which the business information is customized in the transaction note field, and then the transaction is associated with the business information through the customized transaction note index field and finally the complete transaction is acquired based on the key transaction information, is established. Since the specific transaction can be quickly indexed without re-traversing and parsing the block on the blockchain, the efficiency of backtracking the blockchain transaction is greatly improved. At the same time, because the data comes from the blockchain ledger instead of a database outside the blockchain, the reliability of the data is ensured, which lays cornerstone for backtracking the transaction data.

DESCRIPTION OF THE DRAWINGS

In order to illustrate the technical solutions of the present application more clearly, drawings that need to be used in the description of the embodiments or the prior art will be briefly introduced below. Obviously, the drawings in the following description are only some embodiments of the present application. For those of ordinary skill in the art, other drawings can be obtained based on these drawings without creative work.

EMBODIMENTS OF THE APPLICATION

The present application will be described in detail below based on the drawings and specific embodiments such that the purpose and effects of the present application will become more apparent.

Figure 1:
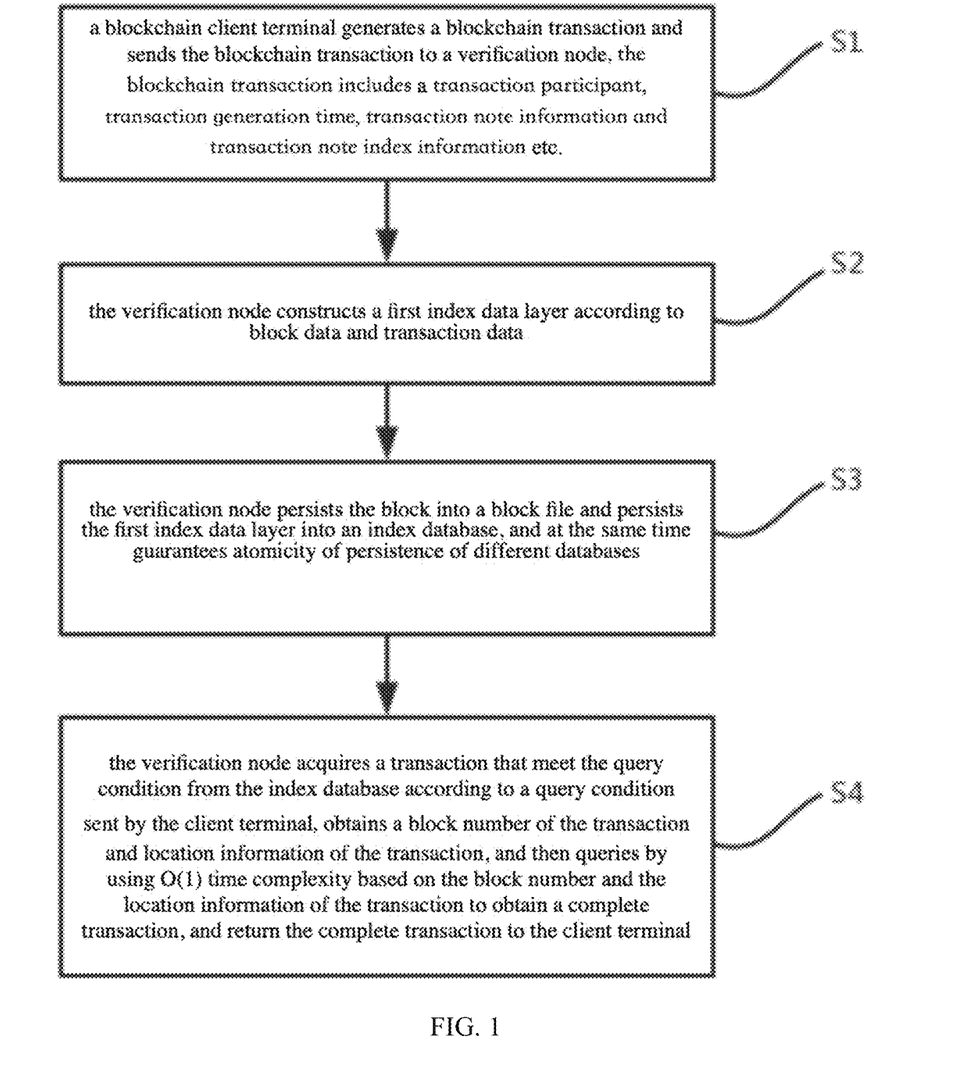
FIG. 1 is a schematic flowchart of the blockchain data index method provided by an embodiment of the present application.

In an embodiment, a blockchain data index method, as shown in FIG. 1, includes following steps.

At a step S1, a blockchain client terminal generates a blockchain transaction and sends the blockchain transaction to a verification node.

The blockchain transaction includes a transaction participant, transaction generation time, transaction note information and transaction note index information, and the transaction participant includes a transaction sender and a transaction receiver. Among them, the transaction note information field and the transaction note index information field are an extension of the present application of the existing transaction data structure.

The transaction note information field is any business-related data customized by the client terminal, such as deposit hash, product information, copyright information, etc.

The transaction note index information field is any business-related index information customized by the client terminal, and its data type includes a number, a string (not more than 1024 bits) or an array. The array includes at least one of a number and a string and indicates that the blockchain transaction is provided with multiple pieces of transaction note index information, and the number of elements (numbers, strings) in the array do not exceed 30. The index information may have a corresponding relationship with the transaction note information field, or there may also be no corresponding relationship, which all depends on how the client terminal is defined. According to the transaction note index information field, a specific one or more transactions may be located, so as to obtain complete business data defined in the transaction, for example, product details defined in the transaction note field are obtained according to a product ID defined in the transaction note index field, operation details defined in the transaction note field are obtained according to the product ID and a product addition/deletion/modification/check operation code defined in the transaction note index field, and a previous transaction is traced according to a transaction hash associated with a last business operation stored in the transaction note index field, and the like. The contents of these two fields are completely and freely defined by the client terminal, and the node does not need to care about the contents of the two fields but only needs to limit sizes of these two fields to prevent DDoS attacks. Through this kind of design, the client terminal can use the characteristics of the blockchain to flexibly develop a desired application.

At a step S2, the verification node receives the transaction sent at step S1, and a consensus generation block generates a block and then executes the block; then key information of each transaction in the block is extracted according to block data and transaction data to construct a first index data layer.

Figure 2:
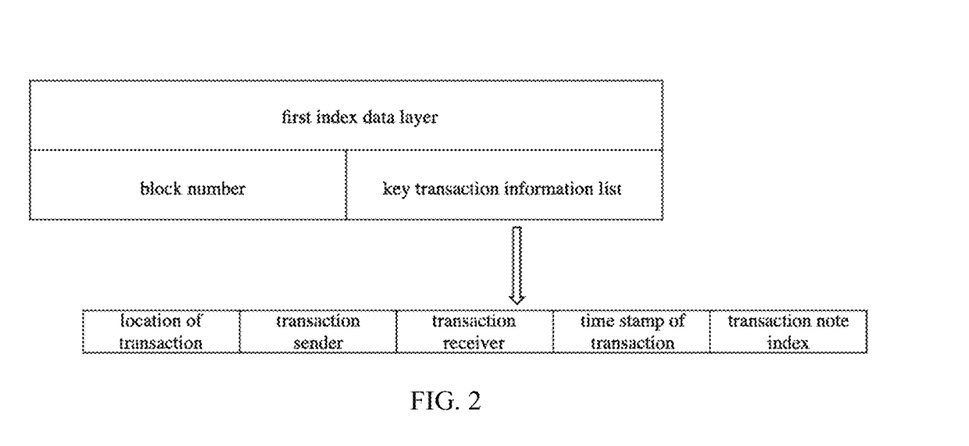
FIG. 2 is a structural schematic diagram of a first index data layer in the blockchain data index method provided by an embodiment of the present application.

In an embodiment, as shown in FIG. 2, the first index data layer is in units of blocks, and includes two fields of a block number and a transaction key information list. Each transaction in the transaction key information list includes the transaction participant, the transaction generation time, the transaction note index information and the transaction location information in the block.

At a step S3, the verification node persists the block generated at the step S2 to a block file, and persists the first index data layer constructed at the step S2 to an index database.

Figure 3:
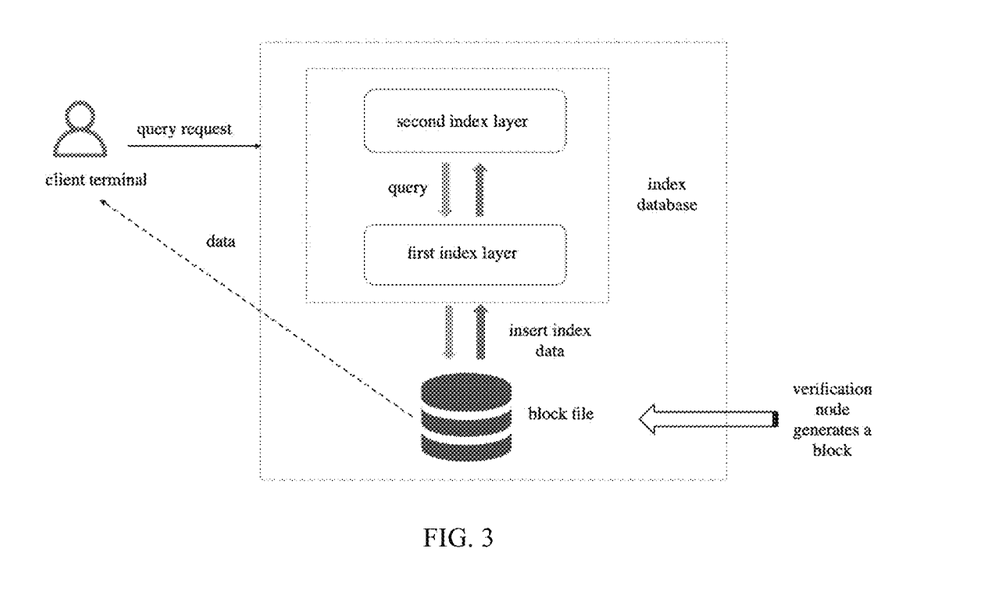
FIG. 3 is a schematic diagram of data flow in the blockchain data index method provided by an embodiment of the present application.

In an embodiment, as shown in FIG. 3, the first index data layer and corresponding block are stored in different databases of the same verification node. The block is stored in the block file that supports a Key-Value query, where the Key is the block number and the Value is the block details; the block file only supports obtaining the block details based on the block number, and then the transaction details are obtained based on the block number and the position of the transaction in the block. The first index data layer is stored in the index database which is a non-relational database supporting SQL-like queries, such as MongoDB. The first index data layer merely includes the key transaction information and is stored in the index database, while the complete detailed information of the transaction and the transaction note information are stored in the block file, which effectively avoids excessive redundant storage of the index database.

Data insertion of the index database and the block file has transaction atomicity. The transaction atomicity means that: one data insertion transaction will be generated every time the node generates one block, the insertion of multiple databases needs to ensure the transaction atomicity, and all databases are either successfully inserted with new data or inserted with no new data. If the block is successfully written into the block file, but the data insertion of the index database fails, then the block file is rolled back. If the index database is successfully inserted with the index data, but the block file fails to be written, then the index database is rolled back. Therefore, as long as the node generates and stores one new block, it may be considered that the corresponding index data will be generated and stored in the index database.

At a step S4, as shown in FIG. 3, when the client terminal sends a query request to the verification node, the verification node acquires a transaction that meet the query condition from the index database of the step S3 according to a query condition sent by the client terminal to obtain a block number of the transaction and location information of the transaction in the block, and then queries by using O(1) time complexity based on the block number and the location information of the transaction in the block to obtain a complete transaction, and return the complete transaction to the client terminal.

The query request includes a query condition and a retrieval mode.

The query condition includes any one or more of conditions of the transaction sender, the transaction receiver, the transaction generation time and the transaction note index information. Among them, when the transaction note index information is an array, the numbers or strings therein have corresponding order.

The retrieval mode includes a multi-condition AND query, a multi-condition OR query, a sequential precise query based on the transaction note index information, a non-sequential precise query based on the transaction note index information, and a non-sequential matching query based on the transaction note index information. When the query condition only includes the transaction note index information and the transaction note index information is an array, the retrieval mode may be selected from the sequential precise query based on the transaction note index information, the non-sequential precise query based on the transaction note index information or the non-sequential matching query based on the transaction note index information. When the query condition is another case, the retrieval mode may be selected from the multi-condition AND query or the multi-condition OR query.

The multi-condition AND query means that the verification node retrieves a transaction in which transaction information fully meets the query condition from the index database. That is to say, when the query condition includes the transaction sender, the transaction receiver or the transaction generation time, correspondingly, a transaction sender field value, a transaction receiver field value and transaction generation time field value in the retrieved transaction information are equal to values of the specified transaction sender, the specified transaction receiver and the specified transaction generation time specified by the query condition; when the query condition includes a condition of the transaction note index information, correspondingly, the transaction note index field in the retrieved transaction information is equal to a specified transaction note index value specified by the query condition, correspondingly, if the specified transaction note index value in the query condition is an array, then the transaction note index field value of the retrieved transaction information is also an array, and element values and an element sequence in the array are exactly the same as the specified array specified by the query condition.

The multi-condition OR query means that the verification node retrieves a transaction in which transaction information partially or completely meets the same query condition from the index database; that is, the retrieved transaction information meets at least one item of the query condition, and only when the retrieved transaction information includes a specified value and its sequence of a condition of the transaction note index information, the transaction information is considered to meet the condition of the transaction note index information in the query condition.

The sequential precise query based on the transaction note index information means that the verification node retrieves a transaction in which the transaction note index field is exactly equal to a specified transaction note index field specified by the query condition from the index database; when a data type of the specified transaction note index information in the query condition is an array, the transaction note index field in the transaction retrieved from the index database must be an array, and the elements and sequence of the elements are exactly equal to the values and sequence specified by the transaction note index field specified by the query condition.

The non-sequential precise query based on the transaction note index information means that the verification node retrieves a transaction in which the transaction note index field includes all specified transaction note index information specified by the query condition from the index database; under this retrieval mode, the data type of the specified transaction note index information specified by the query condition must be an array, and the transaction note index field in the transaction retrieved from the index database must be an array and include all values in the array of the specified transaction note index information specified by the query condition. The sequence of the values in the array is not limited.

The non-sequential matching query based on the transaction note index information means that the verification node retrieves a transaction in which the transaction note index field includes part or all of the specified transaction note index information specified by the query condition from the index database; under this retrieval mode, the data type of the specified transaction note index information specified by the query condition must be an array, the transaction note index field in the transaction retrieved from the index database is an array or is not an array, as long as the transaction note index field includes or is equal to any value in the array of the query condition. If the retrieved transaction note index field is an array and the array includes multiple values specified in the array of the transaction note index information specified by the query condition, the transaction will be considered as a transaction meeting the query condition no matter whether the sequence of these values in the array is consistent with that in the array of the query condition.

As data amount increases sharply, the retrieval efficiency of the index database will be affected by the data amount. In order to further speed up the data retrieval efficiency, when a usage rate of the query condition is high and the query efficiency is low, an index is created for a certain field in the block number field, the transaction participant field, the transaction generation time field and the transaction note index information field etc. in the first index layer of the index database, that is, a second index layer is created to improve the query efficiency of the index database. If the verification node creates the second index layer, then the second index layer is automatically updated when the first index data layer is persisted into the index database at the step S3.

The second index layer refers to a native database index created for a certain field in the first index layer in the index database, which is aimed to accelerate the data query efficiency in the index database. A plurality of decentralized applications are running in the blockchain network, and usage rate of the query condition of the blockchain nodes often depend on different application scenarios on the blockchain, however, transaction structures generated by different application scenarios are the same. Supposing that a plurality of decentralized applications (DApps) are running on the blockchain, among them a DApp A has a greater demand for querying complete transaction details based on the transaction note index information, then the usage rate of this query condition is relatively high, and generally the second index layer is created for the transaction note index field in the index database in order to improve the query efficiency of the DApp A under this query condition. However, the usage rate of this query condition is not high for other DApps, and thus node storage space will be wasted if a corresponding second index data layer is created for a transaction related to these DApps.

Therefore, it is necessary to divide the second index layer into a full index and a partial index. The full index refers to that a native database index is created for a certain field of each of the first index data layer in the index database. The partial index refers to that a native database index is created for a certain field of a partial first index layer in the index database through a filter expression, that is, when the second index layer is created, creation of the second index layer for the field of which part of the first index data layer as well as no creation of the second index layer for the field of which part of the first index data layer are specified through addition of the filter expression. The partial index can reduce storage pressure and reduce performance loss caused by creating and updating the second index layer. In the transaction structure of the blockchain, account addresses include an internal account address and an external account address, among them the internal account address refers to an account address for ordinary transfers and the external account address refers to a contract address, and the transaction receiver in the transaction structure may be the internal account address or the external account address. Therefore, one external account address may be initialized for each DApp, and then different DApps may be distinguished through the address of the transaction receiver. To further illustrate, the foregoing example is taken as an example continuously, a partial index may be created for the DApp A to improve its query efficiency for querying the complete transaction details based on the transaction note index information, and the filter expression for this partial index is specified as: the address of the transaction receiver is the address of the DApp A. In this way, the node may only create the second index layer for the transaction in which the address of the transaction receiver is the address of the DApp A, and no second index layer is created for other transactions.

Specifically, in order to facilitate readers to further understand the benefits and effects of the blockchain data index method, the blockchain data index method will be introduced in detail below by taking an example.

Figure 4:
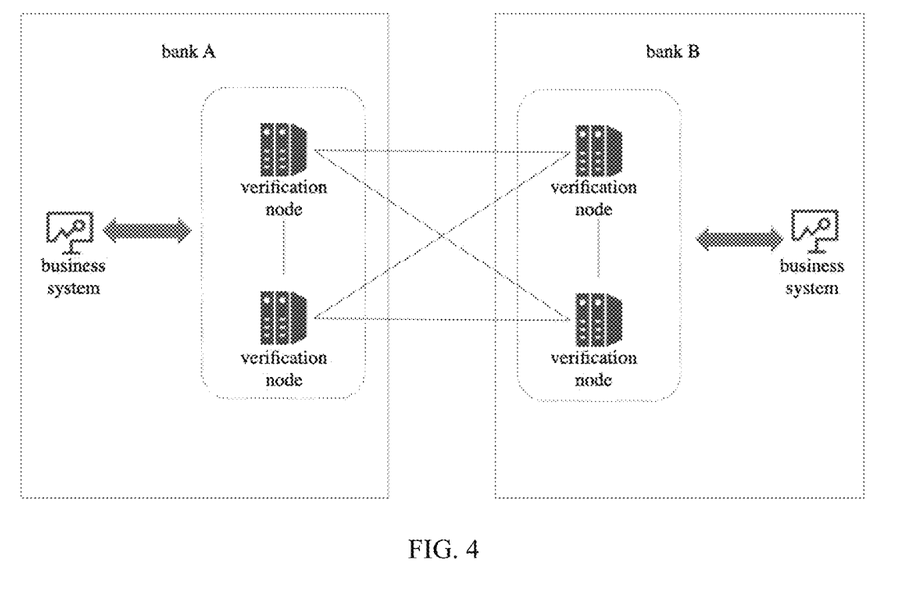
FIG. 4 is a architecture diagram of blockchain-based cross-bank transfer business system provided by an embodiment of the present application.

In an exemplary embodiment, a blockchain-based interbank transfer business system has an overall system architecture as shown in FIG. 4. A bank A and a bank B are respectively deployed with two blockchain verification nodes, and each of the bank A and the bank B is provided with its own business system.

Assuming that a user of the bank A transfers money to a user of the bank B, an inter-bank transfer flow includes: a transfer request initiated by a sender, and examination and approval on this request by the bank A and the bank B in which contents of the examination and approval include verifying whether user accounts are legal, whether accounts are frozen and whether balance is sufficient, and transfer and deduction carried out after the approval is passed through. It can be seen that the transfer flow includes multiple steps, and each of the steps corresponds to one blockchain transaction to record a status of the transfer flow. The business system needs to query the status of the transfer flow to know whether the user's inter-bank transfer is successful. In this business context, a transfer flow ID served as a unique identifier for each transfer is required, and the transfer flow ID may be used as the query condition to acquire the blockchain transaction related to the transfer flow through querying from the verification node. Therefore, it is necessary to define the transfer flow ID in the transaction note index field, and then the desired blockchain transaction data is acquired through querying from the verification node according to the query request formed by the query condition including the transaction note index information and the retrieval mode of the sequential precise query based on the transaction note index.

In an exemplary embodiment, a blockchain-based music copyright information tracking system can easily realize openness and transparency of the music copyright information and infringement traceability of music copyright information through the technology provided in the present application. For example, a song owner publishes the song copyright information onto the blockchain, and the song copyright information includes a lyricist, a composer, a singer, a copyright owner, etc. If a song user uses the song to obtain commercial revenue and the user is not included in the copyright owner, it may be considered that this user has infringed. Every change of the song copyright corresponds to generation of one blockchain transaction to record the latest copyright information. In this business context, the song copyright information is defined in the transaction note field, and a hash of a song audio file is defined in the transaction note index field, and then the blockchain transaction data meeting the condition is acquired through querying from the verification node according to the query request formed by the query condition including the transaction note index information and the retrieval mode of the sequential precise query based on the transaction note index, thereby acquiring the detailed song copyright information defined in the transaction note field.

In an exemplary embodiment, query examples of three kinds of retrieval modes, that is, the sequential precise query based on the transaction note index information, the non-sequential precise query based on the transaction note index information and the non-sequential matching query based on the transaction note index information, are illustrated to promote readers' understanding of these kinds of retrieval modes, and then a desired blockchain-based business system is developed.

Supposing that the transaction note field is named "EXTRA", and the transaction note index field is named "EXTRA_ID". Furthermore, supposing that seven transactions, EXTRA_IDs of which are [123, "abc"], ["abc", 123], [123, "efg", "abc"], [123], ["abc"], 123, "abc" respectively, are existed on the blockchain.

When the retrieval mode is the sequential precise query based on the transaction note index information:
if the query condition is {"EXTRA_ID": [123]}, then only one EXTRA_ID, namely [123], meets the query condition;
if the query condition is {"EXTRA_ID": "abc"}, then only one EXTRA_ID, namely "abc", meets the query condition;
if the query condition is {"EXTRA_ID": [123, "abc"]}, then only one EXTRA_ID, namely [123, "abc"], meets the query condition.

When the retrieval mode is the non-sequential precise query based on the transaction note index information:
if the query condition is {"EXTRA_ID": 123} or {"EXTRA_ID": "abc"}, an error will be returned, since the query condition must be an array in this retrieval mode;
if the query condition is {"EXTRA_ID": [123]}, then four EXTRA_IDs, namely [123, "abc"], ["abc", 123], [123, "efg", "abc"] and 123, meet the query condition; if the query condition is {"EXTRA_ID": [123, "abc"]}, then three EXTRA_IDs, namely [123, "abc"], ["abc", 123] and [123, "efg", "abc"], meet the query condition.

When the retrieval mode is the non-sequential matching query based on the transaction note index information:
if the query condition is {"EXTRA_ID": 123} or {"EXTRA_ID": "abc"}, an error will be returned, since the query condition must be an array in this retrieval mode;
if the query condition is {"EXTRA_ID": [123]}, then five EXTRA_IDs, namely [123, "abc"], ["abc", 123], [123, "efg", "abc"], [123] and 123, meet the query condition;
if the query condition is {"EXTRA_ID": [123, "abc"]}, then all EXTRA_IDs, namely [123, "abc"], ["abc", 123], [123, "efg", "abc"], [123], ["abc"], 123 and "abc", meet the query condition.

An embodiment of the present application further provides a blockchain data storage method, which is applied to a verification node and includes following steps.

At a step S101, a blockchain transaction is acquired.

Here, the blockchain transaction includes a transaction sender, a transaction receiver, transaction generation time, a transaction note and a transaction note index, and the blockchain transaction may be generated by a blockchain client terminal and sent to the verification node.

In an embodiment, a data type of the transaction note index is a number, a string or an array; the array includes at least one kind of a number and a string, and elements in the array are well-organized.

Here, the number of the elements in the array do not exceed 30, and the string does not exceed 1024 bits.

In an embodiment, the transaction note is any transaction-related data customized by the blockchain client terminal that sends the blockchain transaction; the transaction note index is any transaction-related index customized by the blockchain client terminal that sends the blockchain transaction.

At a step S102, the consensus generation block generates a block and executes the block according to the blockchain transaction.

Here, after the verification node receives the blockchain transaction, its own consensus generation block generates the block and executes the block.

At a step S103, a block number of the block is obtained, and key transaction information of each transaction in the block is extracted.

Here, a key information list is generated based on the key transaction information of each transaction in the block, and the key transaction information of each transaction in the key information list includes the transaction sender, the transaction receiver, the transaction generation time, the transaction note index, and location of the transaction in the block.

At a step S104, a first index data layer is constructed according to the key transaction information and the block number.

Here, the first index data layer is in units of blocks, and one unit includes the block number and the key transaction information list (that is, the key transaction information of each transaction).

In an embodiment, after the first index data layer is constructed according to the key transaction information and the block number, the method further includes:
creating a second index layer for a target field in the first index data layer, and updating the second index layer automatically when the first index data layer constructed by a new transaction is persisted into the index database, here the target field is certain a field in the first index data layer.

Here, the second index layer refers to a native database index created for a certain field in the first index layer in the index database, which is aimed to accelerate the data query efficiency in the index database. A plurality of decentralized applications are running in the blockchain network, and a usage rate of the query condition of the blockchain node often depends on different application scenarios on the blockchain, however, transaction structures generated by different application scenarios are the same. Supposing that a plurality of decentralized applications (DApps) are running on the blockchain, among them a DApp A has a greater demand for querying complete transaction details based on the transaction note index information, then the usage rate of this query condition is relatively high, and generally the second index layer is created for the transaction note index field in the index database in order to improve the query efficiency of the DApp A under this query condition. However, the usage rate of this query condition is not high for other DApps, and thus node storage space will be wasted if a corresponding second index data layer is created for a transaction related to these DApps.

In an embodiment, the second index layer includes a full index or a partial index. The full index refers to that a native database index is created for a certain field of each of the first index data layer in the index database. The partial index refers to that a native database index is created for a certain field of a selected partial first index data layer in the index database regarding a certain field of the first index data layer, that is, when the partial index is created, creation of the second index layer for which part of the first index data layer as well as no creation of the second index layer for which part of the first index data layer are specified through addition of a filter expression.

Here, the partial index can reduce storage pressure and reduce performance loss caused by creating and updating the second index layer. In the transaction structure of the blockchain, account addresses include an internal account address and an external account address, among them the internal account address refers to an account address for ordinary transfers and the external account address refers to a contract address, and the transaction receiver in the transaction structure may be the internal account address or the external account address. Therefore, one external account address may be initialized for each DApp, and then different DApps may be distinguished through the address of the transaction receiver. To further illustrate, the foregoing example is taken as an example continuously, a partial index may be created for the DApp A to improve its query efficiency for querying the complete transaction details based on the transaction note index information, and the filter expression for this partial index is specified as: the address of the transaction receiver is the address of the DApp A. In this way, the node may only create the second index layer for the transaction in which the address of the transaction receiver is the address of the DApp A, and no second index layer is created for other transactions.

At a step 105, the first index data layer is persisted into the index database.

Here, the first index data layer and the corresponding block are stored in different databases of the same verification node. The first index data layer is stored in the index database which is a non-relational database supporting SQL-like queries, such as MongoDB. The first index data layer merely includes the key transaction information and is stored in the index database, while the complete detailed information of the transaction and the transaction note information are stored in a block file, which effectively avoids excessive redundant storage of the index database.

At a step S106, the block is persisted into a block file.

Here, the block is stored in the block file that supports a Key-Value query, where the Key is the block number and the Value is the block details; the block file only supports obtaining the block details based on the block number, and then the transaction details are obtained based on the block number and the position of the transaction in the block.

Data insertion of the index database and the block file has transaction atomicity. The transaction atomicity means that: one data insertion transaction will be generated every time the node generates one block, the insertion of multiple databases needs to ensure the transaction atomicity, and all databases are either successfully inserted with new data or inserted with no new data. If the block is successfully written into the block file, but the data insertion of the index database fails, then the block file is rolled back. If the index database is successfully inserted with the index data, but the block file fails to be written, then the index database is rolled back. Therefore, as long as the node generates and stores one new block, it may be considered that the corresponding index data will be generated and stored in the index database.

In an embodiment, the storage method further includes:
acquiring a query request sent by a blockchain client terminal;
acquiring a block number corresponding to key transaction information that meets a query condition in a query request and a location of the transaction in the block from the index database according to a retrieval mode in the query request;
acquiring a complete transaction from the block file according to the block number and location.

Here, the query request includes the query condition and the retrieval mode. The query condition includes any one or more of conditions of the transaction sender, the transaction receiver, the transaction generation time and the transaction note index information. Among them, when the transaction note index information is an array, the numbers or strings therein have corresponding order.

In an embodiment, when the query condition only includes a transaction note index and is a specified array, the retrieval mode is selected from a sequential precise query based on the transaction note index, a non-sequential precise query based on the transaction note index or non-sequential matching query based on the transaction note index. When the query condition is another case, the retrieval mode is selected from a multi-condition AND query or a multi-condition OR query.

In an embodiment, the multi-condition AND query means that the key transaction information of a certain transaction acquired through retrieving by the verification node from the index database meets all items of the query condition; the multi-condition OR query means that the key transaction information of a certain transaction acquired through retrieving by the verification node from the index database meets at least one item of the query condition; here, when the transaction sender, the transaction receiver or the transaction generation time in the key transaction information of a certain transaction are the same with the specified transaction sender, the specified transaction receiver or the specified transaction generation time in the query condition, it means that the key transaction information of this certain transaction meets corresponding one item in the query condition; when the specified transaction note index in the query condition is an array, and when the transaction note index in the key transaction information of a certain transaction is the same as elements and sequence of the elements of the specified transaction note index in the query condition, it means that the key transaction information of this transaction meets this item in the query condition; when the specified transaction note index in the query condition is not an array, and when the transaction note index in the key transaction information of a certain transaction is the same as the number or string of the specified transaction note index in the query condition, it means that the key transaction information of this transaction meets this item in the query condition.

Here, the multi-condition AND query means that the key transaction information of a certain transaction acquired through retrieving by the verification node from the index database meets all items of the query condition, that is, the multi-condition AND query means that the verification node retrieves a transaction in which transaction information fully meets the query condition from the index database. When the query condition includes the transaction sender, the transaction receiver or the transaction generation time, correspondingly, a transaction sender field value, a transaction receiver field value and transaction generation time field value in the retrieved transaction information are equal to values of the specified transaction sender, the specified transaction receiver and the specified transaction generation time specified by the query condition; when the query condition includes a condition of the transaction note index information, correspondingly, the transaction note index field in the retrieved transaction information is equal to a specified transaction note index value specified by the query condition, correspondingly, if the specified transaction note index value in the query condition is an array, then the transaction note index field value of the retrieved transaction information is also an array, and element values and an element sequence in the array are exactly the same as the array specified by the query condition.

The multi-condition OR query means that the key transaction information of a certain transaction acquired through retrieving by the verification node from the index database meets at least one item of the query condition, that is, the multi-condition OR query means that the verification node retrieves a transaction in which transaction information partially or completely meets the same query condition from the index database, the retrieved transaction information meets at least one item of the query condition, and only when the retrieved transaction information includes a specified value and its sequence of a condition of the transaction note index information, this transaction information is considered to meet the condition of the transaction note index information in the query condition.

In an embodiment, the sequential precise query based on the transaction note index means that the transaction note index in the key transaction information of a certain transaction acquired through retrieving by the verification node from the index database is the same as elements and sequence of the elements of the specified transaction note index in the query condition; the non-sequential precise query based on the transaction note index means that the transaction note index in the key transaction information of a certain transaction acquired through retrieving by the verification node from the index database is the same as elements of the specified transaction note index in the query condition; the non-sequential matching query based on the transaction note index means that the transaction note index in the key transaction information of a certain transaction acquired through retrieving by the verification node from the index database includes at least one of elements of the specified transaction note index in the query condition.

Here, the sequential precise query based on the transaction note index means that the verification node retrieves a transaction in which the transaction note index field is exactly equal to the specified transaction note index field specified by the query condition from the index database; when a data type of the specified transaction note index information in the query condition is an array, the transaction note index field in the transaction retrieved from the index database must be an array, and the elements and sequence of the elements are exactly equal to the values and sequence specified by the transaction note index field specified by the query condition.

The non-sequential precise query based on the transaction note index means that the verification node retrieves a transaction in which the transaction note index field includes all specified transaction note index information specified by the query condition from the index database; under this retrieval mode, the data type of the specified transaction note index information specified by the query condition must be an array, and the transaction note index field in the transaction retrieved from the index database must be an array and include all values in the array of the specified transaction note index information specified by the query condition. The sequence of the values in the array is not limited.

The non-sequential matching query based on the transaction note index means that the verification node retrieves a transaction in which the transaction note index field includes part or all of the specified transaction note index information specified by the query condition from the index database; under this retrieval mode, the data type of the specified transaction note index information specified by the query condition must be an array, the transaction note index field in the transaction retrieved from the index database is an array or is not an array, as long as the transaction note index field includes or is equal to any value in the array of the query condition. If the retrieved transaction note index field is an array and the array includes multiple values specified in the array of the specified transaction note index information specified by the query condition, the transaction will be considered as a transaction meeting the query condition no matter whether the sequence of these values in the array is consistent with that in the array of the query condition.

The above embodiments are only used to illustrate, but not used to limit, the technical solutions of the present application. Although the present application has been described in detail with reference to the foregoing embodiments, a person of ordinary skill in the art should understand that the technical solutions described in the foregoing embodiments can still be modified, or some of the technical features therein can be equivalently replaced, however, these modifications or replacements do not cause the essence of the corresponding technical solutions to deviate from the spirit and scope of the technical solutions of the embodiments of the present application, and shall be included within the protection scope of the present application.

What is claimed is:

1. A blockchain data index method, comprising following steps of:
   (1) generating a blockchain transaction and sending the blockchain transaction to a verification node by a blockchain client terminal; wherein the blockchain transaction comprises a transaction sender, a transaction receiver, transaction generation time, a transaction note and a transaction note index; wherein the transaction note index is any business-related data customized by the blockchain client terminal, and a data type of the transaction note index is a number, a string, or an array; wherein the array comprises at least one of a number and a string, and elements in the array are ordered;
   (2) receiving the blockchain transaction sent at the step (1) by the verification node, and generating a block and executing the block by a consensus generation block, and then extracting key transaction information of each blockchain transaction in the block to form a key transaction information list and constructing a first index data layer; wherein the first index data layer comprises a block number and the key transaction information list; wherein the key transaction information comprises the transaction sender, the transaction receiver, the transaction generation time, the transaction note index, and a location of the blockchain transaction in the block;
   (3) persisting the block generated at the step (2) to a block file and persisting the first index data layer constructed at the step (2) to an independent index database by the verification node;
   wherein the first index data layer and corresponding block are stored in different databases of the same verification node, the block is stored in the block file that supports a Key-Value query, and the first index data layer is stored in the index database which is a non-relational database supporting SQL-like queries;
   (4) sending a query request comprising a query condition and a retrieval mode to the verification node by a client terminal; wherein the query condition comprises one or more of a specified transaction sender, a specified transaction receiver, specified transaction generation time and a specified transaction note index; wherein the retrieval mode comprises a multi-condition AND query, a multi-condition OR query, a sequential precise query based on the specified transaction note index, a non-sequential precise query based on the specified transaction note index and a non-sequential matching query based on the specified transaction note index;
   (5) acquiring a block number corresponding to key transaction information of a transaction meeting the query condition and a location of this transaction in the block from the index database acquired at the step (3) by the verification node according to the retrieval mode in the query request sent by the client terminal at the step (4), and querying the block file acquired at the step (3) to acquire a complete transaction and returning the complete transaction to the client terminal by the verification node.

2. The blockchain data index method of claim 1, wherein when the query condition only comprises the specified transaction note index and is a specified array, the retrieval mode is selected from the sequential precise query based on the specified transaction note index, the non-sequential precise query based on the specified transaction note index or the non-sequential matching query based on the specified transaction note index; when the query condition is another case, the retrieval mode is selected from the multi-condition AND query or the multi-condition OR query.

3. The blockchain data index method of claim 2, wherein the multi-condition AND query refers to that key transaction information of a certain transaction acquired through retrieving by the verification node from the index database meets all items of the query condition; the multi-condition OR query refers to that key transaction information of a transaction acquired through retrieving by the verification node from the index database meets at least one item of the query condition; wherein: when the transaction sender, the transaction receiver or the transaction generation time in the key transaction information of the transaction are the same with the specified transaction sender, the specified transaction receiver or the specified transaction generation time in the query condition, the key transaction information of the transaction meets corresponding one item in the query condition; when the specified transaction note index in the query condition is an array, and when the transaction note index in the key transaction information of the transaction is the same as elements and sequence of the elements of the specified transaction note index in the query condition, the key transaction information of the transaction meets this item in the query condition; when the specified transaction note index in the query condition is not an array, and when the transaction note index in the key transaction information of the transaction is the same as the number or string of the specified transaction note index in the query condition, the key transaction information of the transaction meets this item in the query condition.

4. The blockchain data index method of claim 2, wherein the sequential precise query based on the specified transaction note index refers to that a transaction note index in key transaction information of a transaction acquired through retrieving by the verification node from the index database is the same as elements and sequence of the elements of the specified transaction note index in the query condition; the non-sequential precise query based on the specified transaction note index refers to that a transaction note index in key transaction information of a transaction acquired through retrieving by the verification node from the index database is the same as elements of the specified transaction note index in the query condition; the non-sequential matching query based on the specified transaction note index refers to that a transaction note index in key transaction information of a transaction acquired through retrieving by the verification node from the index database comprises at least one of elements of the specified transaction note index in the query condition.

5. The blockchain data index method of claim 1, wherein the blockchain data index method further comprising: creating a native database index as a second index layer for a field in the first index data layer in the index database acquired at the step (3), and updating the second index layer automatically when the verification node persists the first index data layer constructed by a new transaction into the index database.

6. The blockchain data index method of claim 5, wherein the second index layer is a full index or a partial index; the full index refers to that a native database index is created for a field of each of the first index data layer in the index database; the partial index refers to that, regarding a field of the first index data layer, a part of the first index data layer in the index database is selected and a native database index is created for the field of the part of the first index data layer, wherein when the partial index is created, creation of the second index layer for which part of the first index data layer as well as no creation of the second index layer for which part of the first index data layer are specified through addition of a filter expression.

7. The blockchain data index method of claim 1, wherein the transaction note is any transaction-related data customized by the blockchain client terminal; and the transaction note index is any transaction-related index customized by the blockchain client terminal.

8. The blockchain data index method of claim 1, wherein the number of the elements in the array is no more than 30.

9. The blockchain data index method of claim 1, wherein the block file supports a Key-Value query; and the index database adopts a non-relational database that supports SQL-like queries.

10. A blockchain data storage method, applied to a verification node and comprising:
acquiring a blockchain transaction, wherein the blockchain transaction comprises a transaction sender, a transaction receiver, transaction generation time, a transaction note and a transaction note index; wherein the transaction note index is any business-related data customized by the blockchain client terminal;
generating a block and executing the block by a consensus generation block according to the block chain transaction;
acquiring a block number of the block, and extracting key transaction information of each blockchain transaction in the block, wherein the key transaction information comprises the transaction sender, the transaction receiver, the transaction generation time, the transaction note index, and a location of the blockchain transaction in the block;
constructing a first index data layer according to the key transaction information and the block number;
persisting the first index data layer into an independent index database;
persisting the block into a block file;
wherein the first index data layer and corresponding block are stored in different databases of the same verification node, the block is stored in the block file that supports a Key-Value query, and the first index layer is stored in the index database which is a non-relational database supporting SQL-like queries.

11. The blockchain data storage method of claim 10, wherein after constructing the first index data layer according to the key transaction information and the block number, the blockchain data storage method further comprises:
creating a second index layer for a target field in the first index data layer, and updating the second index layer automatically when the first index data layer constructed by a new transaction is persisted into the index database, wherein the target field is a field in the first index data layer.

12. The blockchain data storage method of claim 11, wherein the second index layer is a full index or a partial index;
the full index refers to that a native database index is created for a field of each of the first index data layer in the index database;
the partial index refers to that, regarding a field of the first index data layer, a part of the first index data layer in the index database is selected and a native database index is created for the field of the part of the first index data layer, wherein when the partial index is created, creation of the second index layer for which part of the first index data layer as well as no creation of the second index layer for which part of the first index data layer are specified through addition of a filter expression.

13. The blockchain data storage method of claim 10, wherein the blockchain data storage method further comprises:
acquiring a query request sent by the blockchain client;
acquiring a block number corresponding to key transaction information of a transaction meeting a query condition in the query request and a location of this transaction in the block from the index database according to a retrieval mode in the query request;

querying the block file to acquire a complete transaction according to the block number and the location.

14. The blockchain data storage method of claim 13, wherein when the query condition only comprises a specified transaction note index and is a specified array, the retrieval mode is selected from a sequential precise query based on the specified transaction note index, a non-sequential precise query based on the specified transaction note index or a non-sequential matching query based on the specified transaction note index; when the query condition is another case, the retrieval mode is selected from a multi-condition AND query or a multi-condition OR query.

15. The blockchain data storage method of claim 14, wherein the multi-condition AND query refers to that key transaction information of a transaction acquired through retrieving by the verification node from the index database meets all items of the query condition;

the multi-condition OR query refers to that key transaction information of a transaction acquired through retrieving by the verification node from the index database meets at least one item of the query condition;

wherein: when the transaction sender, the transaction receiver or the transaction generation time in the key transaction information of the transaction are the same with a specified transaction sender, a specified transaction receiver or specified transaction generation time in the query condition, the key transaction information of the transaction meets corresponding one item in the query condition;

when the specified transaction note index in the query condition is an array, and when the transaction note index in the key transaction information of the transaction is the same as elements and sequence of the elements of the specified transaction note index in the query condition, the key transaction information of the transaction meets this item in the query condition;

when the specified transaction note index in the query condition is not an array, and when the transaction note index in the key transaction information of the transaction is the same as a number or a string of the specified transaction note index in the query condition, the key transaction information of the transaction meets this item in the query condition.

16. The blockchain data storage method of claim 14, wherein the sequential precise query based on the specified transaction note index refers to that a transaction note index in key transaction information of a transaction acquired through retrieving by the verification node from the index database is the same as elements and sequence of the elements of the specified transaction note index in the query condition;

the non-sequential precise query based on the specified transaction note index refers to that a transaction note index in key transaction information of a transaction acquired through retrieving by the verification node from the index database is the same as elements of the specified transaction note index in the query condition;

the non-sequential matching query based on the specified transaction note index refers to that a transaction note index in key transaction information of a transaction acquired through retrieving by the verification node from the index database comprises at least one of elements of the specified transaction note index in the query condition.

17. The blockchain data storage method of claim 10, wherein a data type of the transaction note index is a number, a string, or an array; wherein the array comprises at least one of a number and a string, and elements in the array are ordered.

18. The blockchain data storage method of claim 17, wherein the transaction note is any transaction-related data customized by the blockchain client terminal transmitting the blockchain transaction; and the transaction note index is any transaction-related index customized by the blockchain client terminal transmitting the blockchain transaction.

19. The blockchain data storage method of claim 10, wherein the block file supports a Key-Value query; and the index database adopts a non-relational database that supports SQL-like queries.

20. A device, comprising:
one or more processors; and
a memory configured to store one or more programs;
wherein when executed by the one or more processors, the one or more programs cause the one or more processors to execute:
(1) generating a blockchain transaction and sending the blockchain transaction to a verification node by a blockchain client terminal; wherein the blockchain transaction comprises a transaction sender, a transaction receiver, transaction generation time, a transaction note and a transaction note index; wherein the transaction note index is any business-related data customized by the blockchain client terminal, and a data type of the transaction note index is a number, a string, or an array; wherein the array comprises at least one of a number and a string, and elements in the array are ordered;
(2) receiving the blockchain transaction sent at the step (1) by the verification node, and generating a block and executing the block by a consensus generation block, and then extracting key transaction information of each blockchain transaction in the block to form a key transaction information list and constructing a first index data layer; wherein the first index data layer comprises a block number and the key transaction information list; wherein the key transaction information comprises the transaction sender, the transaction receiver, the transaction generation time, the transaction note index, and a location of the blockchain transaction in the block;
(3) persisting the block generated at the step (2) to a block file and persisting the first index data layer constructed at the step (2) to an independent index database by the verification node;
wherein the first index data layer and corresponding block are stored in different databases of the same verification node, the block is stored in the block file that supports a Key-Value query, and the first index data layer is stored in the index database which is a non-relational database supporting SQL-like queries;
(4) sending a query request comprising a query condition and a retrieval mode to the verification node by a client terminal; wherein the query condition comprises one or more of a specified transaction sender, a specified transaction receiver, specified transaction generation time and a specified transaction note index; wherein the retrieval mode comprises a multi-condition AND query, a multi-condition OR query, a sequential precise query based on the specified transaction note index, a non-sequential precise query based on the specified transaction note index and a non-sequential matching query based on the specified transaction note index; and (5) acquiring a block number corresponding to key transaction information of a transaction meeting the query condition and a location of this transaction in the block from the index database acquired at the step (3) by the verification node according to the retrieval mode in the query request sent by the client terminal at the step (4), and querying the block file acquired at the step (3) to acquire a complete transaction and returning the complete transaction to the client terminal by the verification node;

or to execute:

acquiring a blockchain transaction, wherein the blockchain transaction comprises a transaction sender, a transaction receiver, transaction generation time, a transaction note and a transaction note index;

generating a block and executing the block by a consensus generation block according to the block chain transaction;

acquiring a block number of the block, and extracting key transaction information of each blockchain transaction in the block, wherein the key transaction information comprises the transaction sender, the transaction receiver, the transaction generation time, the transaction note index, and a location of the blockchain transaction in the block;

constructing a first index data layer according to the key transaction information and the block number;

persisting the first index data layer into the index database;

persisting the block into a block file.

* * * * *